United States Patent
Khuu et al.

(10) Patent No.: US 8,930,499 B2
(45) Date of Patent: Jan. 6, 2015

(54) DATA REPLICATION BETWEEN SOFTWARE VERSIONS

(75) Inventors: Trung Nghia Khuu, Sydney (AU); Philip Seik Poon Chan, Wahroonga (AU); Lee Berry, Ashfield (AU)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 12/833,398

(22) Filed: Jul. 9, 2010

(65) Prior Publication Data

US 2012/0011495 A1   Jan. 12, 2012

(51) Int. Cl.
G06F 15/16    (2006.01)
G06F 9/44    (2006.01)
G06F 17/30    (2006.01)
G06F 9/445    (2006.01)

(52) U.S. Cl.
CPC ............ *G06F 17/30575* (2013.01); *G06F 8/65* (2013.01)
USPC ............................ 709/219; 717/105; 717/170

(58) Field of Classification Search
USPC .......................................................... 709/219
See application file for complete search history.

(56) References Cited

U.S. PATENT DOCUMENTS

| | | | |
|---|---|---|---|
| 5,915,112 A * | 6/1999 | Boutcher | 719/330 |
| 6,304,882 B1 | 10/2001 | Strellis et al. | |
| 7,162,689 B2 * | 1/2007 | Demers et al. | 715/227 |
| 7,254,631 B2 * | 8/2007 | Crudele et al. | 709/224 |
| 7,403,958 B2 | 7/2008 | Biswal et al. | |
| 7,433,899 B2 | 10/2008 | Pearson et al. | |
| 7,587,431 B1 | 9/2009 | Rao et al. | |
| 7,603,391 B1 * | 10/2009 | Federwisch et al. | 1/1 |
| 7,797,336 B2 * | 9/2010 | Blair et al. | 707/773 |
| 8,555,272 B2 * | 10/2013 | Wetherly et al. | 717/170 |
| 2002/0178255 A1 * | 11/2002 | Hobart | 709/224 |
| 2003/0137536 A1 * | 7/2003 | Hugh | 345/744 |
| 2003/0145315 A1 * | 7/2003 | Aro et al. | 717/170 |
| 2004/0193655 A1 | 9/2004 | Miyata et al. | |
| 2005/0043620 A1 * | 2/2005 | Fallows et al. | 600/437 |
| 2006/0206542 A1 * | 9/2006 | Wolfgang et al. | 707/203 |
| 2009/0183150 A1 * | 7/2009 | Felts | 717/173 |
| 2010/0175059 A1 * | 7/2010 | Wetherly et al. | 717/170 |
| 2010/0287529 A1 * | 11/2010 | Costa et al. | 717/105 |

* cited by examiner

*Primary Examiner* — Hamza Algibhah
*Assistant Examiner* — James Edwards
(74) *Attorney, Agent, or Firm* — Patterson & Sheridan, LLP

(57) ABSTRACT

A method, computer program product, and system for data replication between software versions is described. A method may comprise determining if a first item created in a first software version includes data native to a second item in a second software version. The method may further comprise, if the first item created in the first software version includes data native to the second item in the second software version, storing the data native to the second item in the second software version as native data. The method may also comprise, if the first item created in the first software version is missing required data based upon, at least in part, the second item in the second software version, storing a default value for the missing required data as native data.

17 Claims, 4 Drawing Sheets

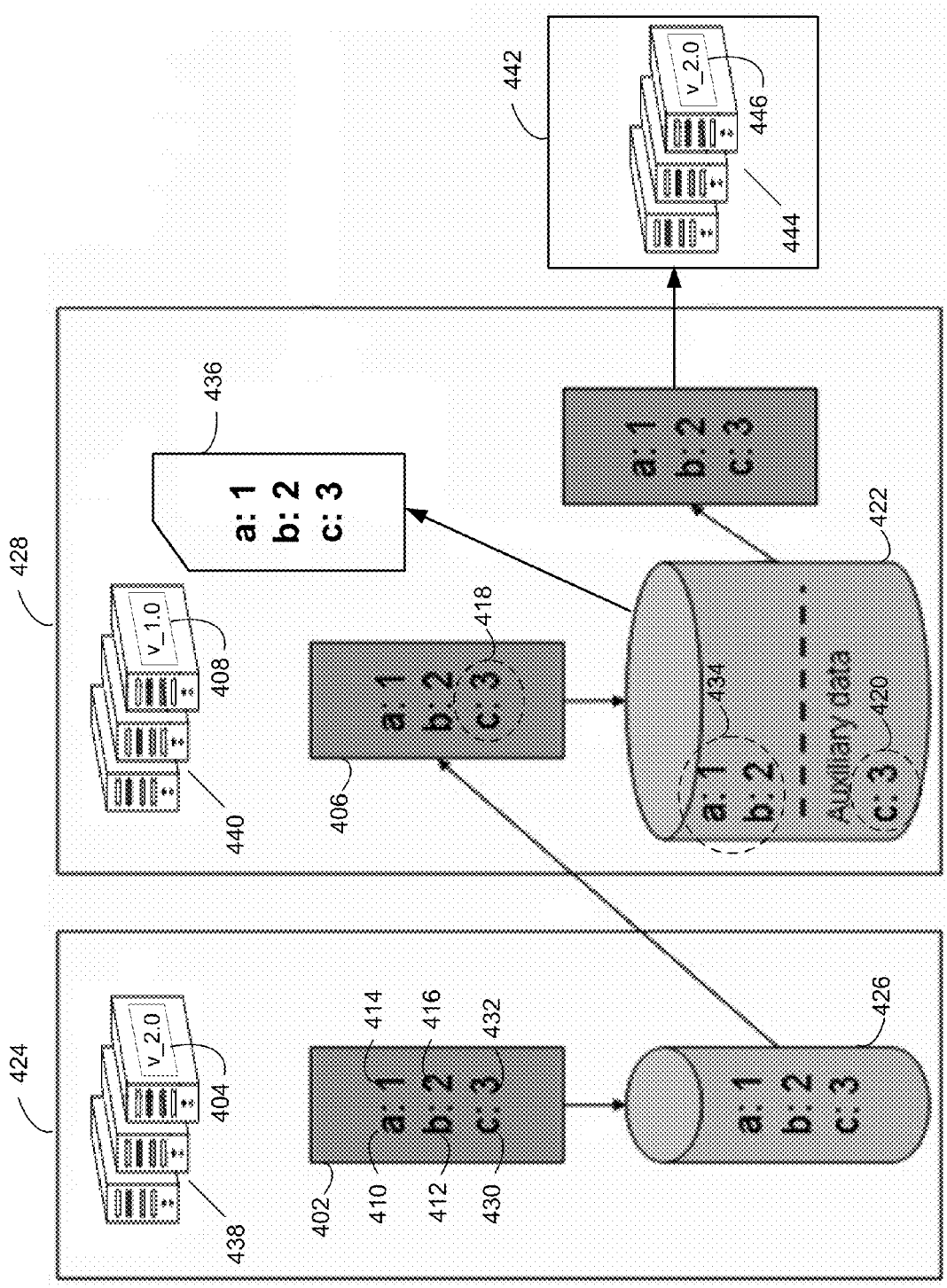

DATA REPLICATION BETWEEN SOFTWARE VERSIONS

BACKGROUND OF THE INVENTION

This disclosure relates to data replication between software versions and, more particularly, to methodologies for maintaining functionality with respect to data created in a different software version.

Distributed applications may require data to be replicated between different computing environments to ensure a responsive experience. For example, in a content management application, separate authoring, user acceptance test, and delivery computing environments may exist. Each computing environment may include a separate copy of a content repository upon which operations in each computing environment may be performed.

When software updates (e.g., incremental service packs and/or installation of a new release) are applied, it may be necessary to update all computing environments together to ensure data consistency and compatibility. A new version of the application may add a new feature. The new feature may add new fields to the content repository. For the application to continue to run and maintain correct information in the repository, it may be necessary that all computing environments use the same version of a repository schema.

Distributed applications may be large, especially enterprise applications, and updating multiple computing environments may be difficult, especially if each computing environment is a clustered system. Uptime requirements may be affected, and the risk of manual errors may be increased. Accordingly, there may be a need to improve ways to replicate data between software versions.

BRIEF SUMMARY OF THE INVENTION

In a first embodiment, a method may comprise, determining, via at least one of a client electronic device and a server computer, if a first item created in a first software version includes data native to a second item in a second software version. The method may further comprise, if the first item created in the first software version includes data native to the second item in the second software version, storing, via at least one of the client electronic device and the server computer, the data native to the second item in the second software version as native data. The method may also comprise, if the first item created in the first software version is missing required data based upon, at least in part, the second item in the second software version, storing, via at least one of the client electronic device and the server computer, a default value for the missing required data as native data. The method may additionally comprise, if the first item created in the first software version includes data that is non-native to the second item in the second software version, storing, via at least one of the client electronic device and the server computer, the data non-native to the second item in the second software version as auxiliary data.

One or more of the following features may be included. The first item may be sent from a first computing environment running the first software version to a second computing environment running the second software version. The first item may be loaded after the first software version is upgraded to the second software version in the same computing environment. The native data and the auxiliary data may be sent to a downstream computing environment when the second item in the second software version is sent to the downstream environment.

In some implementations, at least one of the native data, the required data, and the non-native data may include at least one field. A field may be stored as native data, wherein the required data may include the field and the default value may correspond to the field. The at least one field may have been added to a schema in the second software version. All required data may be loaded into memory if the second item in the second software version is used. The non-native data may be stored in its original format. The auxiliary data may be stored persistently.

In second embodiment, a computer program product may reside on a computer readable storage medium and may have a plurality of instructions stored on it. When executed by a processor, the instructions may cause the processor to perform operations comprising, determining if a first item created in a first software version includes data native to a second item in a second software version. The operations may further comprise, if the first item created in the first software version includes data native to the second item in the second software version, storing the data native to the second item in the second software version as native data. The operations may also comprise, if the first item created in the first software version is missing required data based upon, at least in part, the second item in the second software version, storing a default value for the missing required data as native data. The operations may additionally comprise, if the first item created in the first software version includes data that is non-native to the second item in the second software version, storing the data non-native to the second item in the second software version as auxiliary data.

One or more of the following features may be included. The first item may be sent from a first computing environment running the first software version to a second computing environment running the second software version. The first item may be loaded after the first software version is upgraded to the second software version in the same computing environment. The native data and the auxiliary data may be sent to a downstream computing environment when the second item in the second software version is sent to the downstream computing environment.

In some implementations, at least one of the native data, the required data, and the non-native data may include at least one field. A field may be stored as native data, wherein the required data may include the field and the default value may correspond to the field. The at least one field may have been added to a schema in the second software version. All required data may be loaded into memory if the second item in the second software version is used. The non-native data may be stored in its original format. The auxiliary data may be stored persistently.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to determine if a first item created in a first software version includes data native to a second item in a second software version. Further, the computing system may include a second software module configured to, if the first item created in the first software version includes data native to the second item in the second software version, store the data native to the second item in the second software version as native data. Additionally, the computing system may include a third software module configured to, if the first item created in the first software version is missing required data based upon, at least in part, the second item in the second software version, store a default value for the missing required data as native data. The computing system may also include a fourth software module configured to, if the first item created in the first software version includes data that is non-native to the second item in the second software version, store the data non-native to the second item in the second software version as auxiliary data.

One or more of the following features may be included. The first item may be sent from a first computing environment running the first software version to a second computing environment running the second software version. The first item may be loaded after the first software version is upgraded to the second software version in the same computing environment. The native data and the auxiliary data may be sent to a downstream computing environment when the second item in the second software version is sent to the downstream computing environment.

In some implementations, at least one of the native data, the required data, and the non-native data may include at least one field. A field may be stored as native data, wherein the required data may include the field and the default value may correspond to the field. The at least one field may have been added to a schema in the second software version. All required data may be loaded into memory if the second item in the second software version is used. The non-native data may be stored in its original format. The auxiliary data may be stored persistently.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 4 is a diagram showing two computing environments that may be associated with the data replication process.

DETAILED DESCRIPTION OF THE INVENTION

Figure 1:
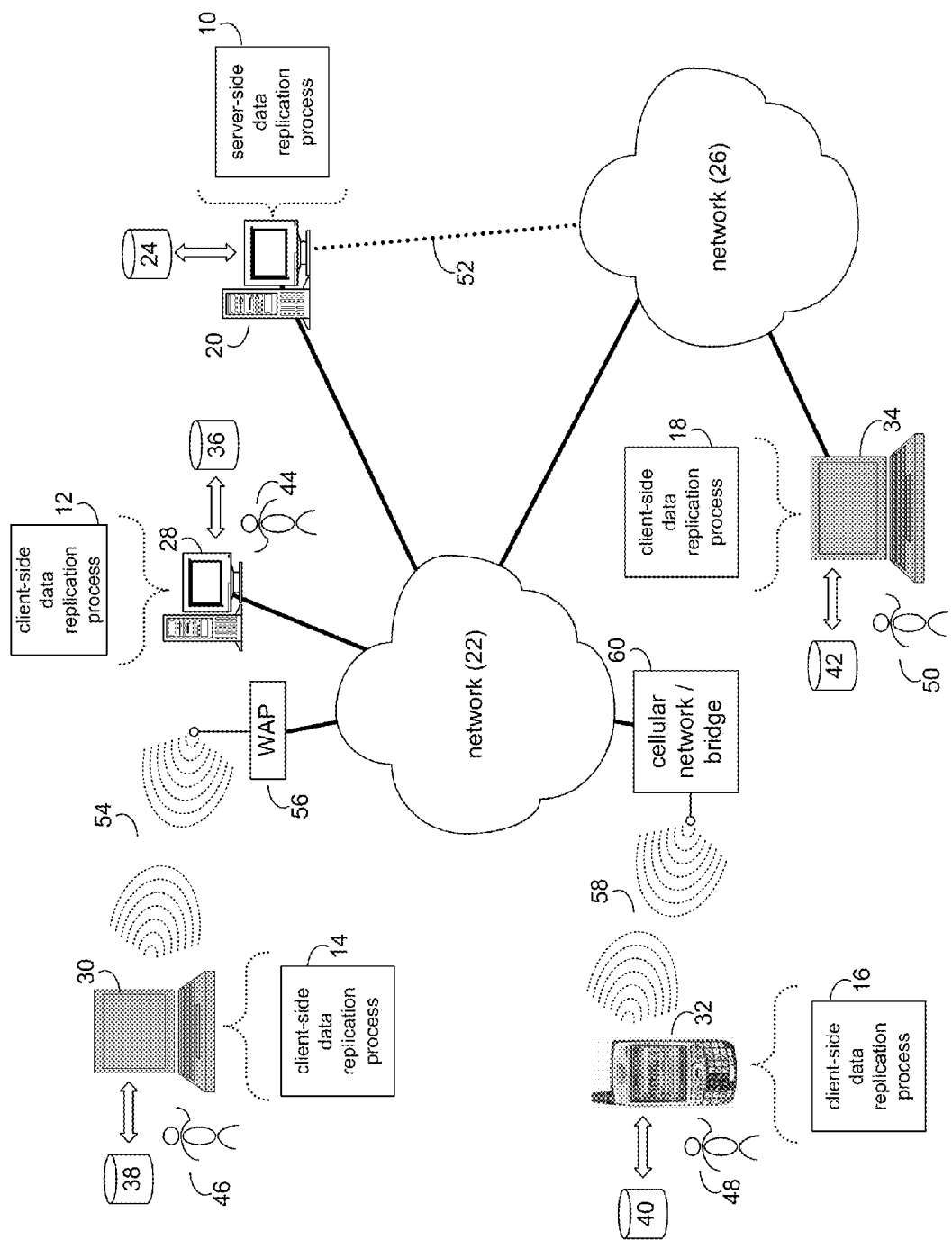
FIG. 1 is a diagrammatic view of a data replication process coupled to a distributed computing network.
Figure 2:
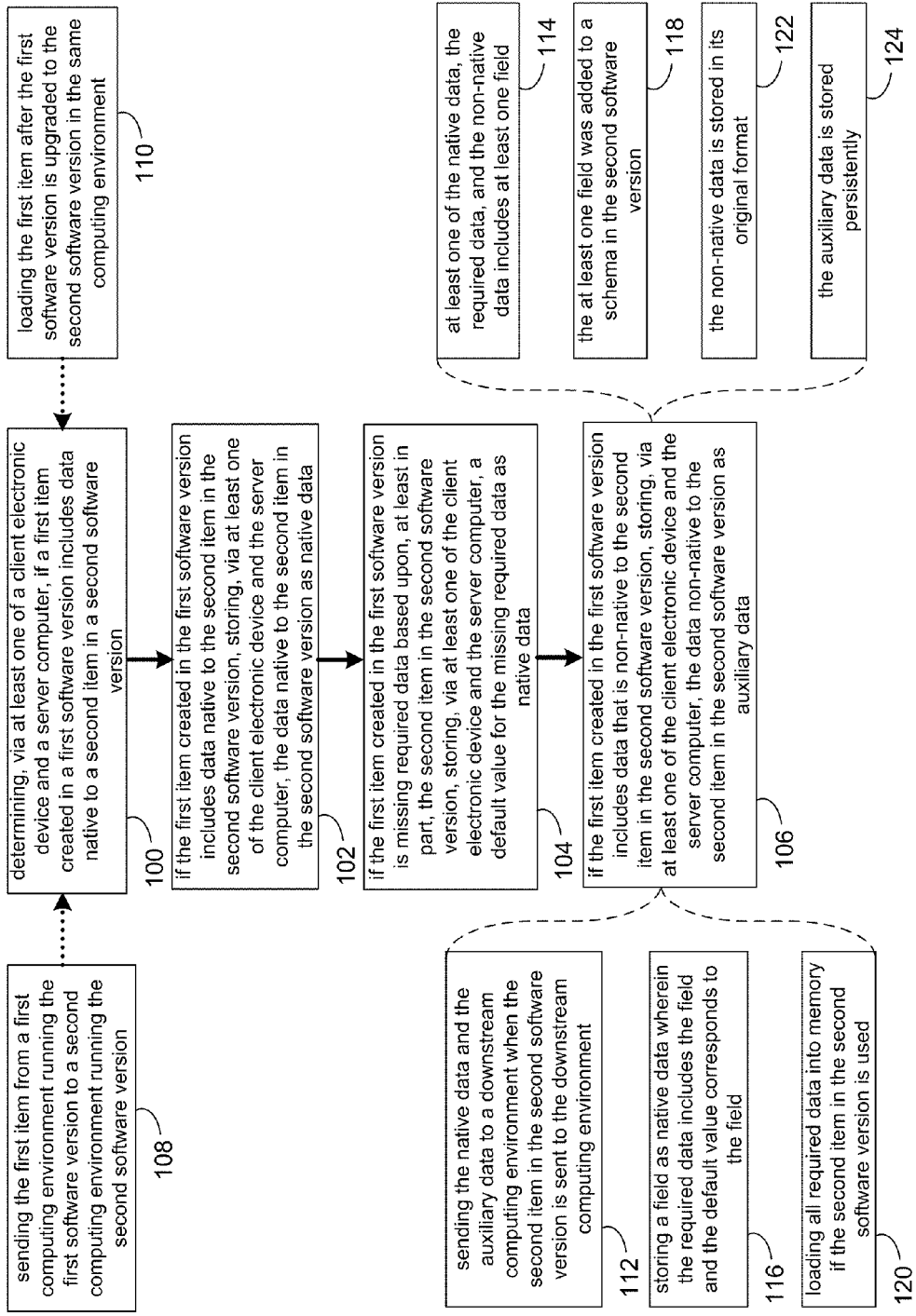
FIG. 2 is a flowchart of the data replication process of FIG. 1.

Referring to FIGS. 1 & 2, there is shown a data replication process 10. As will be discussed below, data replication process 10 may determine 100 if a first item created in a first software version includes data native to a second item in a second software version. If the first item created in the first software version includes data native to the second item in the second software version, data replication process 10 may store, via at least one of the client electronic device and the server computer, the data native to the second item in the second software version as native data. Each version of a software application may be assigned a unique version name and/or number. Each version name and/or number may represent a different state of the software application and may correspond to new developments in the software application.

The data replication (DR) process may be a server-side process (e.g., server-side DR process 10), a client-side process (e.g., client-side DR process 12, client-side DR process 14, client-side DR process 16, or client-side DR process 18), or a hybrid server-side/client-side process (e.g., the combination of server-side DR process 10 and one or more of client-side DR processes 12, 14, 16, 18).

Server-side DR process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side DR process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side DR processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side DR processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side DR processes 12, 14, 16, 18 and/or server-side DR process 10 may be processes that run within (i.e., are part of) a content management application. Alternatively, client-side DR processes 12, 14, 16, 18 and/or server-side DR process 10 may be stand-alone applications that work in conjunction with the content management application. One or more of client-side DR processes 12, 14, 16, 18 and server-side DR process 10 may interface with each other (via network 22 and/or network 26) to allow a plurality of users (e.g., users 44, 46, 48, 50) to share information. In one implementation client-side DR processes 12, 14, 16, 18 and/or server-side DR process 10 may be processes that run within or in connection with a web content management system, including but not limited to IBM® Lotus® Web Content Management.

Users 44, 46, 48, 50 may access server-side DR process 10 directly through the device on which the client-side DR process (e.g., client-side DR processes 12, 14, 16, 18) is executed, namely client electronic devices 28, 30, 32, 34, for example. Users 44, 46, 48, 50 may access server-side DR process 10 directly through network 22 and/or through secondary network 26. Further, server computer 20 (i.e., the computer that executes server-side DR process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11 g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

THE DATA REPLICATION PROCESS

DR process 10 may allow data replication between computing environments using different versions of software and/or schema. A schema may be a description of a structure of a database system and may define, for example, the tables, fields, and other elements of the database system. One computing environment may send data to another computing environment which may support an older or newer version of the software. Regardless of which version of software the data was originally created in, functionality may be maintained on computing environments running an older or newer version of the software. For the following discussion, server-side DR process 10 will be described for illustrative purposes. Client-side DR process 12 may be incorporated into server-side DR process 10 and may be executed within one or more applications that allow for communication with client-side DR process 12. However, this is not intended to be a limitation of this disclosure, as other configurations are possible (e.g., stand-alone, client-side DR processes and/or stand-alone server-side DR processes.) For example, some implementations may include one or more of client-side DR processes 14, 16, 18 in place of or in addition to client-side DR process 12.

Figure 3:
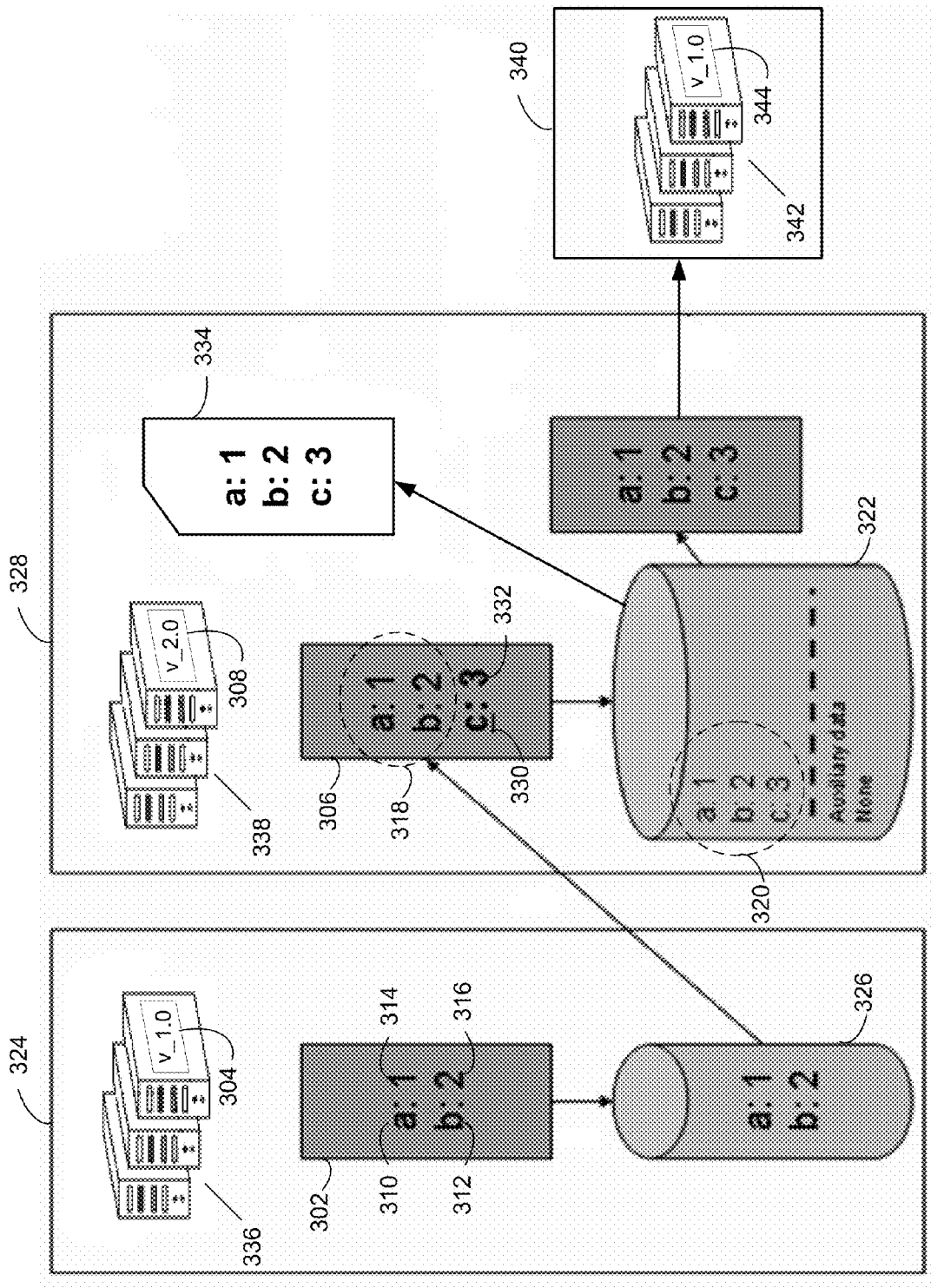
FIG. 3 is a diagram showing two computing environments that may be associated with the data replication process.

Referring now to FIGS. 1-3, DR process 10 may determine 100 if a first item (e.g., item 302) created in a first software version (e.g., software version 304) includes data native (e.g., data 318) to a second item (e.g., item 306) in a second software version (e.g., software version 308). Item 302 may include one or more fields, tables, and/or other elements in a database. The one or more fields, tables, and/or other elements may include one or more values. For example, item 302 may include fields 310 and 312 (shown in FIG. 3 as field "a" and field "b", respectively). Fields 310 and 312 may include values (e.g., values 314 and 316). Each value (e.g., values 314 and 316) may correspond to a specific field (e.g., fields 310 and 312). Item 306 may also include one or more fields, tables, and/or other elements in a database, which may include one or more values.

In this example, software version 304 (shown as version "1.0") may be an older software version than software version 308 (shown as version "2.0"). Item 302 may have been created while software version 304 installed in computing environment 324 was in use. Computing environment 324 may be a clustered system (e.g., computer cluster 336 in computing environment 324), which may be a plurality of computers linked together. Computers in a clustered system (e.g., computer cluster 336) may work closely together, and in many respects may be treated as a single computer. Item 302 may be saved in hard drive 326 of computing environment 324. Hard drive 326 may reside in or may be in communication with one or more of the computers in computer cluster 336.

Item 302 may be sent 108 from computing environment 324 running software version 304 to computing environment 328 running software version 308. Computing environment 328 may also be a clustered system (e.g., computer cluster 338). DR process 10 may read a field of item 302 on the destination computing environment (e.g., computing environment 328). If item 302 created in software version 304 includes data native (e.g., data 318) to item 306 in software version 308, DR process 10 may store 102 the data native (e.g., data 318) to item 306 in software version 308 as native data (e.g., native data 320). For example, fields 310 and 312 of item 302 in software version 304 may be native to item 306 in software version 308 (as depicted by field "a" and field "b" in item 306). Native data 320 may be stored persistently (e.g., in hard drive 322 or flash memory). Hard drive 322 may reside in or may be in communication with one or more of the computers in computer cluster 338.

Computing environment 324 and computing environment 328 may be used as part of a corporation's web content management system. For example, computing environment 324 may be in the corporation's facility in San Francisco and computing environment 328 may be in the corporation's facility in Philadelphia. The corporation may operate a website through which its customers enter data. The San Francisco facility may run software version 304, or version 1.0, which may be a web application, in connection with the corporation's website. The Philadelphia facility may run software version 308, or version 2.0, which may be a later version of the web application including further developments and features. Fields a and b may have been features included in version 1.0 of the web application, and field c may be a feature that was added to version 2.0 of the web application, in addition to fields a and b. Since fields a and b are included in both items 302 and 306 of version 1.0 and version 2.0, respectively, fields a and b and their corresponding values (e.g., values 314 and 316, shown as "1" and "2" in FIG. 3) may be considered native data.

If item 302 created in software version 304 is missing required data (e.g., data for field 330 shown in FIG. 3 as field "c") based upon, at least in part, item 306 in software version 308, DR process 10 may store 104 a default value (e.g., default value 332) for the missing required data (e.g., data for field 330 shown in FIG. 3 as field "c") as native data (e.g., native data 320). As discussed above, field 330 may have been added to software version 308. Since field 330 may not have existed in software version 304, field 330 and a meaningful default value (e.g., default value 332) may be added to item 306. Item 306 may then be stored persistently as native data 320 (e.g., in hard drive 322 or flash memory). In other words, the missing required data (e.g., field 330 with default value 332 corresponding to field 330) may be stored 116 as native data 320.

Further, when item 306 is used by computing environment 328 running software version 308, DR process 10 may load 120 all required fields (e.g., fields a, b, and c as shown in hard drive 322) into memory (e.g., memory 334 in computing environment 328). Fields a, b, and c may be loaded with their corresponding values (e.g., "1", "2", and "3", respectively). Memory 334 may reside in or may be in communication with one or more of the computers in computer cluster 338. Additionally, all fields, including field 330, may be sent to downstream computing environments (e.g., downstream computing environment 340) when item 306 is sent to downstream computing environments (e.g., downstream computing environment 340). Downstream computing environment 340 may also be a clustered system and may include computer cluster 342 running software version 344. In this way, DR process 10 may ensure that data and functional integrity are maintained between computing environments.

Referring now also to FIG. 4, item 402 may include one or more fields, tables, and/or other elements in a database. The one or more fields, tables, and/or other elements may include one or more values. For example, item 402 may include fields 410, 412 and 430 (shown in FIG. 3 as field "a", field "b", and field "c", respectively). Fields 410, 412 and 430 may include values (e.g., values 414, 416, and 432). Each value (e.g., values 414, 416, and 432) may correspond to a specific field (e.g., fields 410, 412, and 430). Item 406 may also include one or more fields, tables, and/or other elements in a database, which may include one or more values.

In this example, software version 404 (shown as version "2.0" in FIG. 4) may be a newer version than software version 408 (shown as version "1.0" in FIG. 4). Computing environment 424 may also be a clustered system, as described above, and may include computer cluster 438. Item 402 may be saved in hard drive 426 of computing environment 424. Hard drive 426 may reside in, or may be in communication with, one or more of the computers in computer cluster 438. Item 402 may be sent 108 from computing environment 424 running software version 404 to computing environment 428 running software version 408. Computing environment 428 may also be a clustered system, as described above, and may include computer cluster 440.

If a first item (e.g., item 402) created in the first software version (e.g., software version 404 or version "2.0") includes data that is non-native (e.g., data 418) to the second item (e.g., item 406) in the second software version (e.g., software version 408 or version "1.0"), DR process 10 may store 106 the data non-native (e.g., data 418) to the second item (e.g., item 406) in the second software version (e.g., software version 408) as auxiliary data (e.g., auxiliary data 420). For example, field 430 (as depicted by field "c" in item 406) of item 402 in software version 404 may be non-native to item 406 in software version 408. Non-native data may be stored (122) in its original format. Also, auxiliary data 420 may be stored 124 persistently (e.g., in hard drive 422 or flash memory). Hard drive 422 may reside in, or may be in communication with, one or more of the computers in computer cluster 440.

Computing environment 424 and computing environment 428 may also be used as part of the corporation's web content management system. For example, computing environment 424 may be in the corporation's facility in Chicago and computing environment 428 may be in the corporation's facility in Boston. The Chicago facility may run software version 404, or version 2.0, which may be a web application, in connection with the corporation's website. The Boston facility may run software version 408, or version 1.0, which may be an earlier version of the web application that does not include new developments and features. Fields c may be a feature included in version 2.0 of the web application, while fields a and b may be features that previously existed in version 1.0 of the web application. Since field c is included in item 402 of version 2.0, but not in item 406 of version 1.0, field c and its corresponding value (e.g., value 432, shown as "3" in FIG. 4) may be considered non-native data.

In other words, field c may not be used by software version 408 (e.g., version "1.0"). As such, when item 406 is used by computing environment 428 running software version 408, fields a and b may be loaded into memory 436 without field c. Memory 436 may reside in or may be in communication with one or more of the computers in computer cluster 440. However, field c may be used by a downstream computing environment (e.g., downstream computing environment 442), or when computing environment 428 running version 1.0 is upgraded to version 2.0, or later, of the software. Downstream computing environment 442 may be a clustered system, as described above, and may include computer cluster 444. Further, downstream computing environment 442 may run software version 446, which may be version 2.0. Since field c is stored as auxiliary data 420 in e.g., hard drive 422, field c may be used at a later time. Further, DR process 10 may send 112 native data 434 and auxiliary data 420 to downstream computing environment 442 when item 406 in software version 408 (e.g., version 1.0) is sent to downstream computing environment 442. In this way, field c may be available, as auxiliary data 420, to be used by downstream computing environment 442, which may be running version 2.0 of the software.

As discussed above, at least one of the native data, the required data, the non-native data, and the auxiliary data may include (114) at least one field. The at least one field may have been added (118) to a schema in version 2.0 of the software. While DR process 10 is described above as being used when an item is sent between computing environments running different software versions, other uses and configurations are possible. For example, and referring back to FIG. 3, if software version 308 (e.g., version 1.0) of computing environment 324 is upgraded to version 2.0 (in computing environment 324), DR process 10 may load 110 item 306 of version 2.0 after computing environment 324 is upgraded from version 1.0 to version 2.0. DR process 10 may read each field in item 306. DR process 10 may analyze item 306 of version 2.0, and any other items of version 2.0 (i.e., items included with the upgraded version) and handle native data, missing required data, non-native data, and auxiliary data as described above, and as shown in FIG. 2. Auxiliary data may be resaved so that any auxiliary data which may be applicable to the new software version may be written as native data and any unused data may be stored as auxiliary data again. As such, when a computing environment is upgraded to a new version, items included with the new version may be loaded into memory, and saved back to the content repository. In other words, DR process 10 may migrate data from an auxiliary field into a native one. In this way, DR process 10 may ensure that the upgraded computing environment may be using native data and that downstream computing environments may not lose functional integrity.

Further, while DR process 10 may be described above as handling data replication between two different versions of software (e.g., two computing environments running different versions, or one computing environment being upgraded to another version), DR process 10 may handle data replication between any number of versions of software in any number of computing environments. For example, in a system with two computing environments running two different versions of the software, DR process 10 may replicate data from an older version of software to a newer version of the software, or from a newer version of the software to an older version of the software. In a system with three computing environments running two different versions of the software, if data is replicated from an older version of the software to a newer version of the software, it may be replicated back to the older version. Similarly, if data is replicated from a newer version of the software to an older version of the software, it may be replicated back to the newer version. In other words, in the latter situation, data integrity and new functional ability may be maintained in the two computing environments running the newer version of the software, despite the data having passed through a computing environment running the older version of the software.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described.

Nevertheless, it will be understood that various modifications may be made. Accordingly, other embodiments and implementations are within the scope of the following claims.

What is claimed is:

1. A method of replicating a first item from a first software version to a second software version, on a computing system running the second software version, comprising:
for each of a plurality of fields of the first item:
determining whether the field is native to a second item in the second software version;
upon determining that the field is native to the second item in the second software version, storing the field as native data to be loaded into memory of the computing system, wherein the field is determined to be native when the second software version is configured to access and use the field; and
upon determining that the field is non-native to the second item in the second software version, storing the field as auxiliary data to be stored on persistent storage in an original format, wherein the auxiliary data is not loaded into memory of the computing system, and wherein the field is determined to be non-native when the second software version is not configured to recognize the field; and
upon determining that the first item is missing one or more required fields for the second software version, based at least in part on the second item in the second software version, storing a default value for each of the one or more required fields as native data.

2. The method of claim 1, further comprising at least one of:
receiving the first item from a first computing environment running the first software version, at a second computing environment running the second software version; and
loading the first item after the first software version is upgraded to the second software version in the same computing environment.

3. The method of claim 1, further comprising:
sending the native data and the auxiliary data to a downstream computing environment when the second item in the second software version is sent to the downstream computing environment.

4. The method of claim 1, wherein the at least one field was added to a schema in the second software version.

5. The method of claim 1, wherein the first software version and the second software version correspond to different versions of a database, and wherein the plurality of fields include at least one of a database field and a database table.

6. The method of claim 1, wherein the second item represents an object in the second software version that is equivalent to the first item in the first software version, and wherein determining whether the field is native to a second item in the second software version comprises:
determining that the field of the first item is native to the second item, upon determining that the second item includes a second field that corresponds to the field of the first item; and
determining that the field of the first item is non-native to the second item, upon determining that the second item does not include the second field that corresponds to the field of the first item.

7. The method of claim 1, wherein determining that the first item is missing one or more required fields for the second software version further comprises:
determining that the second item contains a second field that does not correspond to any of the plurality of fields of the first item.

8. The method of claim 1, wherein the field is determined to be non-native upon determining that the field was added to a schema in a software version subsequent to the second software version.

9. The method of claim 1, wherein the field is determined to be non-native upon determining that the field was removed from a schema in the second software version.

10. A computer program product residing on a computer readable storage memory having a plurality of instructions stored thereon, which, when executed by a processor, cause the processor to perform an operation for replicating a first item from a first software version to a second software version, on a computing system running the second software version, the operation comprising:
for each of a plurality of fields of the first item:
determining, whether the field is native to a second item in the second software version;
upon determining that the field is native to the second item in the second software version, storing the field as native data to be loaded into memory of the computing system, wherein the field is determined to be native when the second software version is configured to access and use the field;
upon determining that the field is non-native to the second item in the second software version, storing the field as auxiliary data to be stored on persistent storage in an original format, wherein the auxiliary data is not loaded into memory of the computing system, and wherein the field is determined to be non-native when the second software version is not configured to recognize the field; and
upon determining that the first item is missing one or more required fields for the second software version, based at least in part on the second item in the second software version, storing a default value for each of the one or more required fields as native data.

11. The computer program product of claim 10, the operation further comprising at least one of:
receiving the first item from a first computing environment running the first software version, at a second computing environment running the second software version; and
loading the first item after the first software version is upgraded to the second software version in the same computing environment.

12. The computer program product of claim 10, the operation further comprising:
sending the native data and the auxiliary data to a downstream computing environment when the second item in the second software version is sent to the downstream computing environment.

13. The computer program product of claim 10, wherein the at least one field was added to a schema in the second software version.

14. A computing system comprising:
a processor; and
a memory containing a second software version and a program that, when executed by the processor, performs an operation for replicating a first item from a first software version to the second software version, the operation comprising:
for each of a plurality of fields of the first item:
determining whether the field is native to a second item in the second software version;
upon determining that the field is native to the second item in the second software version, storing the field as native data to be loaded into the memory of the computing system, wherein the field is determined to be native when the second software version is configured to access and use the field; and
upon determining that the field is non-native to the second item in the second software version, storing the field as auxiliary data to be stored on persistent storage in an original format, wherein the auxiliary data is not loaded into the memory of the computing system, and wherein the field is determined to be non-native when the second software version is not configured to recognize the field; and
upon determining that the first item is missing one or more required fields for the second software version, based at least in part on the second item in the second software version, storing a default value for each of the one or more required fields as native data.

15. The computing system of claim 14, the operation further comprising at least one of:
receiving the first item from a first computing environment running the first software version, at a second computing environment running the second software version; and
loading the first item after the first software version is upgraded to the second software version in the same computing environment.

16. The computing system of claim 14, the operation further comprising:
sending the native data and the auxiliary data to a downstream computing environment when the second item in the second software version is sent to the downstream computing environment.

17. The computing system of claim 14, wherein at least one of the plurality of fields was added to a schema in the second software version.

\* \* \* \* \*